United States Patent [19]

Ormond

[11] 4,012,953
[45] Mar. 22, 1977

[54] SHORT TERM CREEP COMPENSATION FOR LOAD CELLS

[76] Inventor: Alfred Newman Ormond, 11969 E. Rivera Road, Santa Fe Springs, Calif. 90670

[22] Filed: Mar. 18, 1976

[21] Appl. No.: 667,991

[52] U.S. Cl. .......................... 73/141 A; 73/88.5 R
[51] Int. Cl.² ...................... G01L 1/04; G01L 1/22
[58] Field of Search ................ 73/88.5 R, 88.55 D, 73/141 A; 177/211

[56] References Cited
UNITED STATES PATENTS

| | | | |
|---|---|---|---|
| 3,105,564 | 10/1963 | Ormond | 177/211 |
| 3,201,983 | 8/1965 | Hebert | 73/141 A |
| 3,667,041 | 5/1972 | Senour | 73/88.5 R X |

*Primary Examiner*—James J. Gill
*Attorney, Agent, or Firm*—Ralph B. Pastoriza

[57] ABSTRACT

Short term creep compensation for load cells, platform scales, bench scales and the like is achieved by introducing a thermo-couple in series with one of the output leads from the load cell and utilizing an amplified output signal derived from the original output signal to generate heat which is transferred to a terminal or both terminals of the thermo-couple. The thermo-couple provides a compensating signal which is equal and opposite to the output drift resulting from the creep characteristics so that the final output signal is fully compensated. Proper generation of the compensating signal can be controlled by the gain of the amplifier, polarity of the input signal to the amplifier, and the transfer characteristics from the heater to the thermo-couple terminal.

5 Claims, 6 Drawing Figures

SHORT TERM CREEP COMPENSATION FOR LOAD CELLS

This invention relates to a method and system for the short term compensation of drift in an output signal from a load cell, platform scale, bench scale or similar device subject to creep characteristics.

BACKGROUND OF THE INVENTION

When some load cells such as used in platform scales or bench scales are loaded, the electrical output normally provided from a bridge circuit incorporating strain gauges on the load cell will drift with time. While such a load cell may have a long-term creep characteristic, it may also display a short-term creep characteristic which would degrade the load measuring system.

BRIEF DESCRIPTION OF THE PRESENT INVENTION

With the foregoing in mind, the present invention contemplates a method and system for compensating drift in an output signal from a load cell resulting from creep characteristics all to the end that a more reliable and accurate load measuring system results.

Essentially, the invention contemplates introducing a signal conditioning means in the output circuit of the load cell and then utilizing the original output signal subject to drift to control the signal conditioning means in a manner to introduce a compensating signal into the output circuit and thereby provide an output signal free of drift.

BRIEF DESCRIPTION OF THE DRAWINGS

A better understanding of this invention will be had by referring to the accompanying drawings in which.

DETAILED DESCRIPTION OF THE INVENTION

Figure 1:
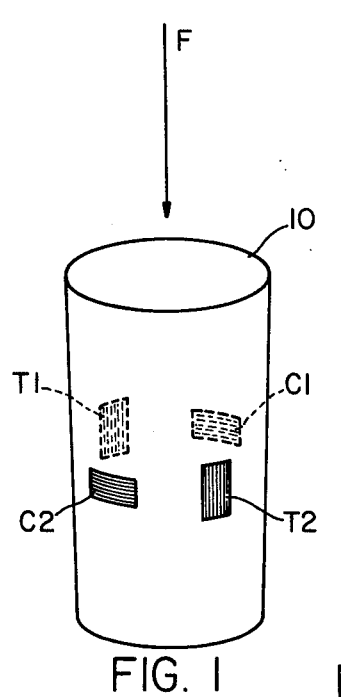
FIG. 1 is a perspective view of a column type load cell as might be used in a weighing platform or bench scale subject to creep characteristics.

Referring first to FIG. 1 there is shown a column type load cell 10 provided with tension and compression strain gauges T1, T2, and C1, C2. When a force F is applied to the load cell 10, the strain gauges T1 and T2 will indicate a change in dimension in a direction parallel to the axis of the column cell 10 while the strain gauges C1 and C2 will indicate a change in dimension circumferentially about the column. If the direction of the force F is reversed so that the column 10 is in tension, the change in dimensions indicated by the respective strain gauges will reverse.

Figure 2:
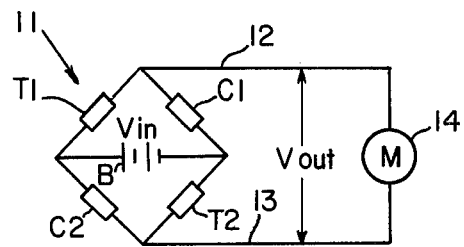
FIG. 2 is a schematic electrical diagram of a typical bridge circuit providing an output signal proportional to the load or force applied to the cell of FIG. 1.

Referring to FIG. 2, the tension and compression strain gauges are shown connected into a typical bridge circuit 11 in a well known manner. Thus, the tension strain gauges T1 and T2 connect in opposite legs of the bridge and the compression strain gauges C1 and C2 connect in the remaining opposite legs of the bridge. The diagonally opposite corners between the respective strain gauges T1, C2 and C1, T2 are provided with input voltage from battery B. The bridge output is taken from the other diagonally opposite corners on first and second output leads 12 and 13. A measuring system or meter M indicated at 14 detects the output voltage signal Vout.

Figure 3:
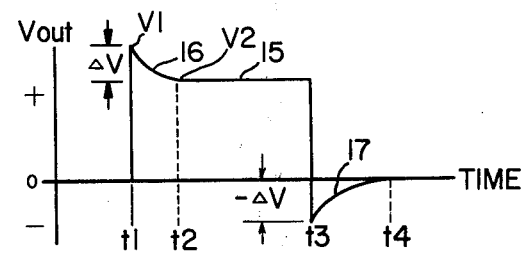
FIG. 3 is a plot of the output circuit with time illustrating drift resulting from creep characteristics of the cell of FIG. 1.

FIG. 3 illustrates a plot of the output signal Vout as a function of time for a given load F applied to the load cell of FIG. 1. When the load is initially applied as at time $t1$, the signal output is shown at V1. At the time $t2$ the signal decreases to a value V2. The drop in signal $\Delta V$ becomes asymptotic as indicated by the curve 16 usually in a period of time less than ten minutes.

When the force on the load cell of FIG. 1 is removed, the load decreases to zero, for example, at the time $t3$. The output signal, however, drops below the zero point and then returns to zero at time $t4$. This latter curved portion indicated at 17 is a mirror image of the applied load curve.

The drift in the output signal indicated by the $\Delta V$ and the $-\Delta V$ is a consequence of the heretofore referred to short-term creep characteristic of the load cell under consideration.

Figure 4:
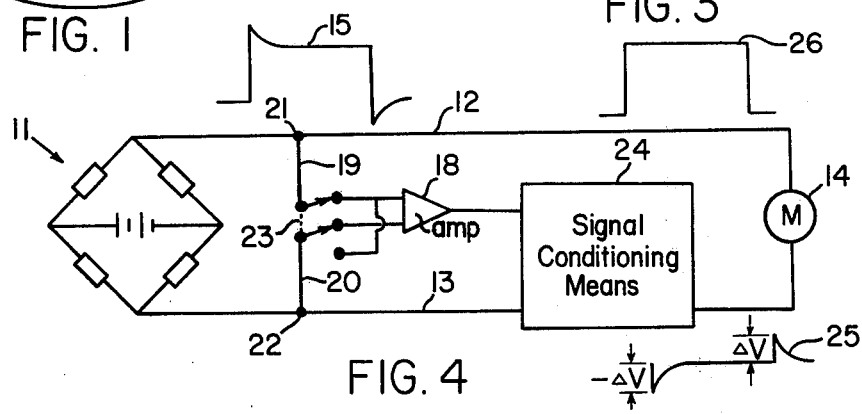
FIG. 4 is a general electrical diagram of a system for compensating for creep characteristics.

The original signal can be restored to the desired square wave form in accord with the present invention through the use of a gain amplifier and a signal conditioning means as illustrated in FIG. 4. Essentially, the amplifier and conditioning means induce a signal in the output circuit equal and opposite to that of the drift.

Thus, referring specifically to FIG. 4 there is reproduced the bridge circuit 11 and output leads 12 and 13 of FIG. 2. The original output signal is also reproduced at 15. An amplifier 18 has first and second input leads 19 and 20 tapped off from the output leads 12 and 13 as at 21 and 22. The polarity of the original output signal to the amplifier 18 can be switched at the input leads 19 and 20 as schematically illustrated by the reversing switch 23.

The amplified output signal from the amplifier 18 connects to a signal conditioning means indicated by the block 24 in series with the second output lead 13. This signal conditioning means is responsive to the amplified output signal to introduce into the second output lead a compensating signal equal and opposite to the drift of the original output signal as schematically depicted at 25. The resulting final output signal to the measuring means or meter 14 is indicated at 26 wherein the drift portions resulting from creep characteristics have been wholly removed.

Figure 5:
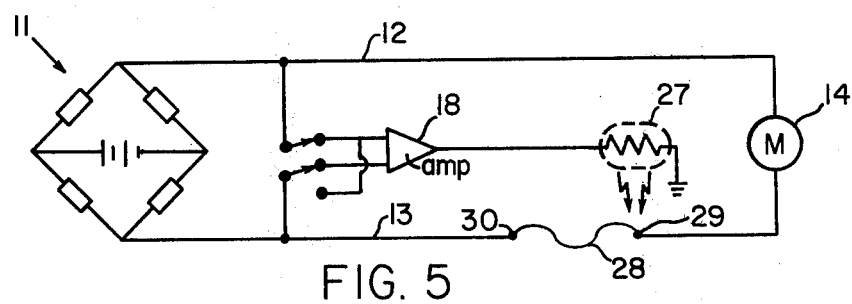
FIG. 5 illustrates one specific embodiment of the system of FIG. 4.

Referring now to FIG. 5 there is shown a first example of the signal conditioning means which might be incorporated in the block 24 of FIG. 4. This means includes a heating means 27 receiving the amplified output signal for radiating heat of intensity controlled by the gain of the amplifier 18. A thermo-couple means 28 has first and second terminals 29 and 30 connected in series in the second lead 13 and is positioned to receive the heat radiated from the heating means 27. In this respect, the first terminal 29 of the thermo-couple 28 is positioned to pick up heat transfer from the heating means 27.

The heating means 27 and thermo-couple 28 are electrically isolated. With the proper polarity in the amplifier 18, the feed forward signal from the heating means 27 will be proportional to time and the amplitude of the uncompensated or original output signal. Compensation is proportional to the gain set into the amplifier 18. Time is proportional to the rate of heat transfer between the heating means 27 and thermo-couple terminal 29. Therefore, by adjusting the gain and establishing the size of the terminal 29 in the thermo-couple junction a family of curves can be obtained, one of which can be set to compensate for any particular load cell.

Figure 6:
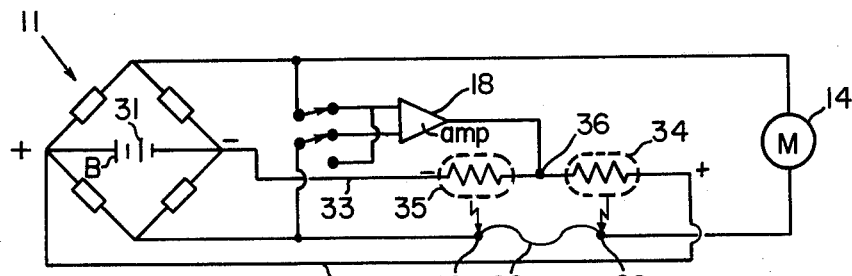
FIG. 6 illustrates a further embodiment of the system of FIG. 4.

FIG. 6 illustrates a modified signal conditioning means which is similar to the circuit of FIG. 5 except that it is bidirectional. In this respect, a fixed d-c voltage source 31 such as the battery B in the bridge circuit 11 is provided on + and − leads 32 and 33 to heater means which take the form of first and second spaced heaters 34 and 35 connected in series between the leads 32 and 33. The amplified output signal from amplifier 18 in turn connects to the junction point 36 between the heaters 34 and 35. The junction terminals 29 and 30 of the thermo-couple 28, respectively, are in heat transfer relationship with the first and second heaters 34 and 35.

With the foregoing arrangement, the amplified output signal will increase the voltage across one of the heaters and decrease the voltage across the other to thereby cause one of the thermo-couple end terminals to increase in temperature and the other to decrease to cause the thermo-couple to act in one direction. Reversal of polarity of the amplified output signal in turn will reverse the direction of action of the thermal couple so that the original output signal is compensated through changes in polarity as a result of the load cell changing from a tension to a compression load.

In both embodiments of FIGS. 5 and 6, the compensating signal provided by the thermo-couple means is in the form of a back emf, the form of the compensating signal being controlled by the polarity and magnitude of the amplified output signal controlling the heating means and the degree of heat transfer from the heating means to the thermo-couple means. By controlling the gain and heat transfer parameters as stated heretofore, the form of the compensating signal can be appropriately adjusted to compensate for output signals from different load cells having different creep characteristics.

The load cell described in FIG. 1 has a negative short-term return to zero. Some load cells have characteristics with a positive short-term non-return to zero. In this case, the compensation is reversed and this reversal can be effected by any one of three means. First, the signal to the gain amplifier can be reversed by the reversing switch to change its polarity; second, the location of the heater such as indicated in FIG. 5 can be shifted to irradiate the opposite end or terminal 30 of the thermo-couple; and third, the positive and negative power to the two heating units shown in FIG. 6 on the leads 32 and 33 can be reversed.

From the foregoing description, it will thus be evident that the present invention has provided a novel method and means for compensating for short-term creep characteristics in load cells.

What is claimed is:

1. A system for compensating creep characteristics of a load cell resulting in drift in the load cell output signal, including, in combination:
 a. first and second output leads receiving the original output signal from said load cell;
 b. an amplifier;
 c. first and second input leads for said amplifier connected to tap points on said first and second output leads respectively to provide an amplified output signal at the output of said amplifier; and,
 d. a signal conditioning means connected to the output of said amplifier, said signal conditioning means being responsive to said amplified output signal to introduce into said second output lead a compensating signal equal and opposite to the drift of said original output signal.

2. A system according to claim 1, including means in the input leads of said amplifier to switch the polarity of the original output signal connected to said amplifier.

3. A system according to claim 2, in which the gain of said amplifier is adjustable.

4. A system according to claim 3, in which said signal conditioning means includes heating means receiving said amplified output signal for radiating heat of intensity controlled by the gain of said amplifier; and thermo-couple means having first and second end terminals connected in series in said second lead and positioned to receive the heat radiated from said heating means, said thermo-couple means providing said compensating signal in the form of a back emf, the form of said compensating signal being controlled by the polarity and magnitude of said amplified output signal controlling said heating means and degree of heat transfer from said heating means to said thermo-couple means whereby said compensating signal can be adjusted in form to compensate for output signals from different load cells having different creep characteristics.

5. A system according to claim 4, including a fixed d-c voltage source having + and − leads, said heating means comprising first and second spaced heaters connected in series between said + and − leads of said voltage source, said amplified output signal being applied to a junction point between said first and second heaters, and said first and second end terminals of said thermo-couple means being in heat transfer relationship respectively with said first and second heaters, whereby the amplified output signal will increase the voltage across one of the heaters and decrease the voltage across the other to thereby cause one of the thermo-couple means end terminals to increase in temperature and the other to decrease in temperature to cause the thermo-couple means to act in one direction, reversal of polarity of the amplified output signal reversing the direction of action of the thermo-couple means so that the original output signal is compensated through changes in polarity as a result of the load cell changing from a tension to a compression load.

* * * * *